United States Patent [19]

Morton

[11] Patent Number: 4,793,922

[45] Date of Patent: Dec. 27, 1988

[54] FILTER ELEMENT USING NON-WOVEN MAT AND MULTI FINGER SEPARATORS

[75] Inventor: Eric E. Morton, Wolverhampton, England

[73] Assignee: Marston Palmer Limited, Wolverhampton, England

[21] Appl. No.: 48,649

[22] Filed: May 11, 1987

[30] Foreign Application Priority Data

May 15, 1986 [GB] United Kingdom ............... 8611911

[51] Int. Cl.⁴ ............................................. B01D 29/46
[52] U.S. Cl. .................................... 210/317; 210/483; 210/489; 210/497.01; 210/497.2; 210/499; 55/485; 55/486
[58] Field of Search ............... 210/314, 317, 483, 488, 210/489, 490, 491, 492, 497.01, 497.2, 498, 510.1, 316, 318; 55/485, 486

[56] References Cited

U.S. PATENT DOCUMENTS 2,850,169  9/1958  Briggs .................................. 210/488
3,037,633  6/1962  Veitel et al. ......................... 210/488
3,152,988  10/1964 Gutkowski et al. ................. 210/488
3,397,794  8/1968  Toth et al. ........................... 210/488

FOREIGN PATENT DOCUMENTS 0188993  7/1986  European Pat. Off. .
861034  10/1986  South Africa .

Primary Examiner—Richard V. Fisher
Assistant Examiner—Wanda L. Millard
Attorney, Agent, or Firm—Cushman, Darby & Cushman

[57] ABSTRACT

A filter element in which the filtering medium is a layer of non-woven metallic fibre mat in which annular discs of filtering medium are separated by a plurality of separators, in two sets. A first set of separators includes an external peripheral wall with inwardly directed fingers, and the second set of separators includes an internal peripheral wall with externally-directed fingers. The separators are selected alternately from the first and second sets and the assembly is bonded together to form a filter assembly.

11 Claims, 2 Drawing Sheets

FILTER ELEMENT USING NON-WOVEN MAT AND MULTI FINGER SEPARATORS

BACKGROUND OF THE INVENTION

This invention relates to filters and has particular, but not exclusive, reference to bonded metal filter assemblies.

Filter elements for removing contaminants from a stream of liquid are well known. Filter elements for removing contaminants from a stream of gas are also well known. Essentially such filter elements comprise a structure which is porous to the carrying medium either liquid or gas, but which can remove contaminants particles from the carrying medium. Numerous materials have been proposed and used for the filter element including paper, plastics, wire mesh, and bonded structure of particles to form porous metal or porous ceramic material.

Some filter elements are capable of holding only small quantities of contaminants without becoming blocked. For some duties however it is required that the filter element be able to hold large quantities of contaminants and still continue to operate. Particularly for aircraft applications it is important that the filters should be able to hold a large quantity of contaminant, so that the filter element need be replaced only infrequently.

SUMMARY OF THE INVENTION

By the present invention there is provided a filter assembly comprising a stacked set of components including a plurality of annular filter elements spaced by annular supports, a first set of supports including a continuous outer wall and inwardly directed fingers, and a second set of supports including a continuous inner wall and outwardly directed fingers, the filter element being spaced by alternate first and second supports, the filter elements and supports being held in tight touching contact.

Preferably some or all of the fingers of the first and second supports are of such a length that they extend across the complete width of the annular portion of the filter element, the width of the annular portion of the filter element is preferably identical to that of the combined length of the inner wall and the outwardly directed fingers in the first set of supports and the outer wall and the inwardly directed fingers of the second set of supports.

The filter assembly may be bonded together. The filter element may be a non-woven wire mesh. The wire mesh may be formed of stainless steel. The inwardly directed fingers on the first set may be tapered to narrow in width, or may be parallel when seen in plan, towards their end. Alternate fingers may be shorter than the remaining inwardly directed fingers to give a longer gap between the fingers than would otherwise be possible.

Outwardly directed fingers may be provided with broadened ends. The outwardly directed fingers may have hammer heads. The interior bore of the second set of supports may be provided with an indexing member. The inner-most end of one or more of the fingers of the first set may be provided with an indexing member. The indexing member for both sets may be a projection or a recess. The indexing member may be such that when the first and second set of supports have their indexing members aligned the fingers of the first set of supports lie directly over the fingers of the second set of supports.

The first and second set of supports may be of stainless steel and may be bonded to the filter elements. The bonding may be by diffusion bonding or by adhesives or by brazing. The first and second set of supports may be of plastics material, in which case the bonding may be by ultrasonic welding or fusion bonding.

There may be provided end caps for the assembly. The end caps may have pairs of inner and outer ridges of matching size and location to the inner and outer continuous walls.

The annular spacer elements may be formed of metal by chemical milling or press tool. The chemical milling can be carried out by a photo-resist process.

The annular members may be of circular shape in plan view or may be rectangular, square, oval, arcuate or any other suitable shape.

BRIEF DESCRIPTION OF THE DRAWINGS

By way of example embodiments of the present invention will now be described with references to the accompanying drawings of which.

DESCRIPTION OF THE PREFERRED EMBODIMENTS

Figure 1:
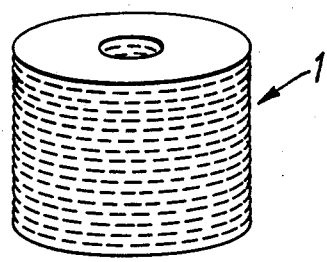
FIG. 1 is a perspective view of a filter assembly in accordance with the invention.
Figure 2:
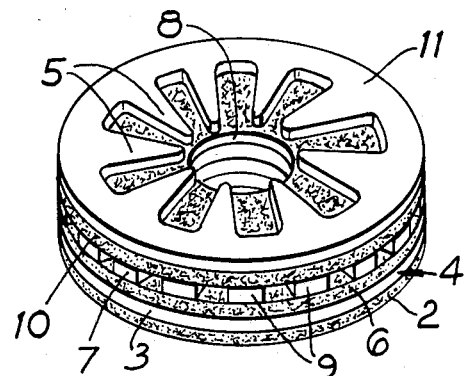
FIG. 2 is part perspective view of one section of a filter assembly.

Referring to the drawings, these show a filter assembly, one which is formed of a stack of individual components. The stack of components is bonded together to form the filter element assembly itself.

Figure 3:
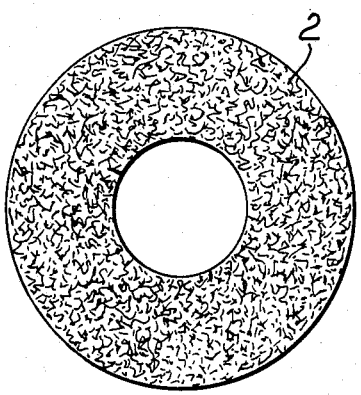
FIG. 3 is a plan view of one filter element.
Figure 4:
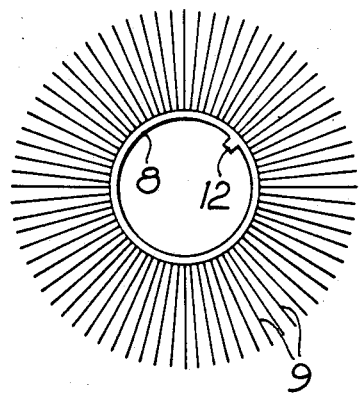
FIG. 4 is a plan view of one spacer element.

The stack is formed by commencing with a layer or disc 2 of non-woven bonded metal fibre material in the form of a felt or mat. The disc 2 is an annular ring as shown clearly in FIG. 3. Located on top of the disc 2 is the first spacer member 3 which has an outer peripheral wall 4 and a plurality of inwardly directed fingers 5. On top of the spacer 3 is located a further disc 6 of filter medium mat identical to disc 2. Located on top of the mat 6 is a second spacer element 7 which has an inner peripheral wall 8 and a series of outwardly directed fingers 9. A further filter element mat in the form of a disc 10 is located on the spacer 7 and a further spacer 11 is then located on disc 10.

The filter assembly is built up by arranging alternate filter discs and spacer discs with each alternate spacer having an inner and outer peripheral wall as clearly shown in FIG. 1.

Figure 5:
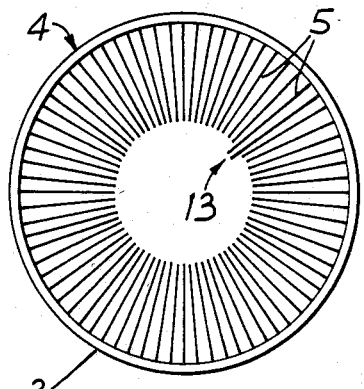
FIG. 5 is a plan view of an alternate spacer element.

The inner peripheral wall 8 is provided with a projection 12 and two of the fingers 5 project further inwardly as shown at 13 in FIG. 5. When assembling the filter element the discs and spacers are slipped over a central rod which has a groove in which the indexing projections 12 and 13 locate.

By this means the fingers 5 can be arranged to lie directly over the fingers 9 and the flow of liquid or fluid from the filter element can be from the outside to the inside, the flow being governed by the inner and outer peripheral walls of the spacer element.

Once a sufficiently high stack of components has been produced—and typically the element would have a disc of 3 cm external diameter a centre bore of 1 cm and be 3 cm high, then the assembly can be compressed and brazed in a suitable manner.

The mat which forms the filter element is preferably a non-woven stainless steel mat. The spacer elements are also formed of stainless steel and may be produced by chemical milling as for example, by a photo-resist production method. Details of the method used to make the spacer members 3 and 7 can be found in the publication "New Ways of Working Metals" by D. Fishlock and K. W. Hards, published by George Newnes Limited, London, England, published in 1965, particularly pages 37-52.

Figure 7:
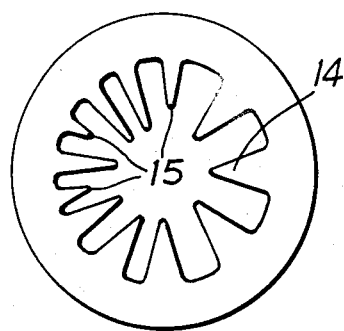

It can be clearly seen from FIG. 5 that the gaps between the fingers on the inside of spacer 3 become very small. It may be desirable therefore, to taper the fingers as shown at 14 in FIG. 7 or to provide an arrangement in which certain of the fingers have a shorter length than the others as shown at 15 in FIG. 7. By this means the internal gaps between the ends of the fingers can be increased.

Figure 6:
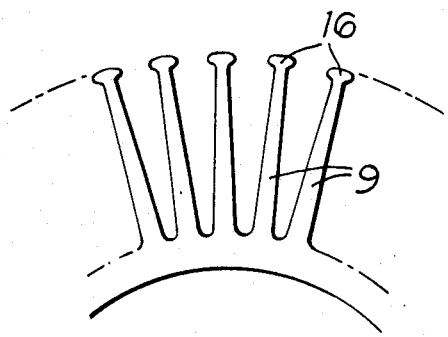
FIGS. 6 and 7 are plan views of different shapes of separators.

In order that the outer ends of the fingers 9 may have an increased surface area to erase the brazing assembly the ends of the fingers 9 may be provided with enlarged heads or hammer heads 16 as shown in FIG. 6.

Figure 8:
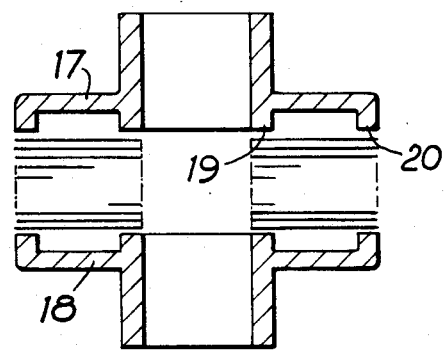
FIG. 8 is a schematic part sectional view of an alternative form of filter assembly incorporating end components.

If required the filter element may be formed with end caps during the brazing operation by utilising end caps as shown in FIG. 8.

End caps 17 and 18 are identical and have raised portions 19, 20 which provide for pressure to be applied to the portions of the filter elements coinciding with outer and inner walls 4 and 8 respectively.

Figure 9:
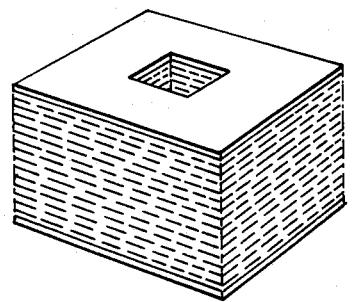
FIG. 9 is a perspective view of an alternate shape of filter element.

Although the circular discs have been described it will be appreciated that the techniques used are clearly formed rectangular filter elements, as shown in FIG. 9, or square, or any other desired shape.

Figure 10:
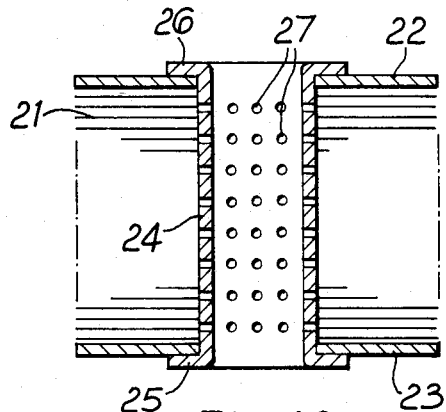
FIG. 10 is a cross-sectional view of an alternate form of filter element, and, FIG. 11 is a cross-sectional view of a further alternate form of filter element.

Referring to FIG. 10 this shows a filter element stack 21 located between a pair of end discs 22, 23. There is provided a mechanism for holding the end discs together which comprises an apertured tube 24 which has a pair of flanges 25, 26 one at each end. To assemble the filter element shown in FIG. 10, the discs and components are placed over an apertured tube which is flanged at one end only, 25. The assembly is then preloaded and the end flange 26 is formed on the tube 24 to hold the assembly together, the preload is then removed. The holes 27, permit flow of liquid through the filter element.

Figure 11:
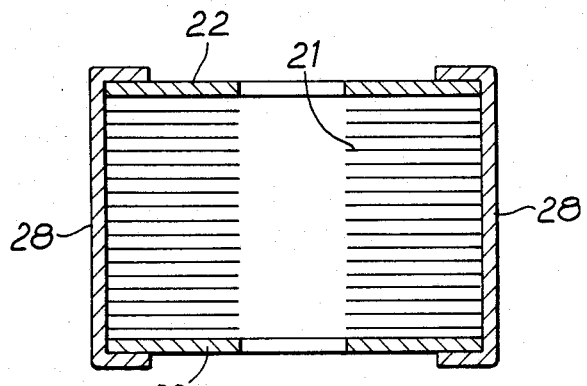

Rather than using the internal tube 24 an external strap may be used as shown in FIG. 11. In FIG. 11 the filter assembly 21 is again located between end discs 22 and 23 but external straps 28 are welded on the outside of the discs to hold the preloaded filter assembly together. Any desired number, such as 3, 4, 5, 6 or more straps may be used as required.

It will also be appreciated that the spacer members could be made of plastics material for filters which do not need to operate at very high operating temperatures.

The preferred metallic filter medium of non-woven metal has approximately four times the dirt-holding capacity than equivalent woven metal cloth. The high porosity of the filter medium gives a low pressure drop. It has a high service temperature capability (up to 550° C. for stainless steel media).

The assembly could be held together by bolts between the end headers. The filter could be then dismantled for cleaning or replacement of elements (possibly using the existing spacer elements. Alternately straps may be used to hold end headers in place.

The filter may be assembled with two or more grades of filter medium in each layer to give a built-in pre-filter.

I claim:

1. A filter assembly, comprising:
   a plurality of annular filter elements having axially opposite faces, an inner perimeter and an outer perimeter;
   a set of first annular filter supports each having axially opposite faces, an inner perimeter and an outer perimeter, and including a perimetrically continuous outer wall and a plurality of medially inwardly-directed fingers having free inner ends, said inwardly-directed fingers being disposed on and forming corresponding parts of said perimetrically continuous outer wall, said inwardly-directed fingers defining said inner perimeter;
   a set of second annular filter supports each having axially opposite faces, an inner perimeter and an outer perimeter, and including a perimetrically continuous inner wall and a plurality of laterally outwardly-directed fingers having free outer ends, said outwardly-directed fingers being disposed on and forming corresponding parts of said perimetrically continuous inner wall, said outwardly-directed fingers defining said outer perimeter;
   said filter elements, first filter supports and second filter supports being arranged face to face in series, in alternation, to provide a stacked set of components; and
   means holding said components in tight touching contact, axially neighboring component to axially neighboring component, in said stacked set;
   said annular filter elements, first filter supports and second filter supports of said stacked set defining among them a flow path for fluid to be filtered, which flow path extends from laterally outwardly of said stacked set, medially inward between said fingers of said second filter supports, axially through said annular filter elements and medially inwardly between said fingers of said first filter supports, to a longitudinal bore defined axially centrally of said stacked set.

2. A filter assembly as claimed in claim 1 further including:
   a medially inwardly-directed indexing means formed on said inner wall of each of said second supports; and
   a medially inwardly-directed indexing means formed on at least but less than a majority of said outer ends of said fingers of said first supports.

3. A filter assembly as claimed in claim 2, wherein:
   said first filter supports and said second filter supports have equal numbers of said fingers per support;

corresponding ones of said indexing means of both said first and second filter supports being arranged in longitudinal alignment throughout said stacked set, and, due to such alignment, corresponding fingers of said first filter supports and said second filter supports being arranged in longitudinal allignment.

4. A filter assembly as claimed in claim 1, wherein: said first and second supports are made of stainless steel.

5. A filter assembly as claimed in claim 4, wherein: said annular filter elements are made of non-woven wire mesh.

6. A filter assembly as claimed in claim 1 in which the filter element is formed of a non-woven wire mesh.

7. A filter assembly as claimed in claim 1 in which some at least of the outwardly directed fingers have broadened ends on narrower shanks.

8. A filter assembly as claimed in claim 1 in which the fingers on the first filter supports are tapered to narrow in width when seen in plan, towards their ends.

9. The filter assembly of claim 1, wherein: within said stacked set, said inner perimeters of said annular filter elements, said first filter supports and said second filter supports are radially substantially coterminous and therefore in registry axially of the stacked set and said outer perimeters of said annular filter elements, said first filter supports and said second filter supports are radially substantially coterminous and therefore in registry axially of the stacked set.

10. A filter assembly as claimed in claim 1, wherein: said annular filter elements are bonded to said first and second supports by said holding means.

11. A filter assembly as claimed in claim 1, further including:
a pair of annular opposite end caps sandwiching said stacked set axially between them, each end cap including an inner perimetrical ridge and an outer perimetrical ridge, both perimetrical ridges on each end cap extending axially inwardly and in substantial axial registry with a corresponding perimeter of said stacked set.

* * * * *